(12) United States Patent
Pashley

(10) Patent No.: US 7,696,252 B2
(45) Date of Patent: *Apr. 13, 2010

(54) PROCESS FOR THE PRODUCTION OF EMULSIONS AND DISPERSIONS

(75) Inventor: Richard M Pashley, Canberra (AU)

(73) Assignee: Australian National University, Canberra ACT (AU)

( * ) Notice: Subject to any disclaimer, the term of this patent is extended or adjusted under 35 U.S.C. 154(b) by 493 days.

This patent is subject to a terminal disclaimer.

(21) Appl. No.: 10/703,094

(22) Filed: Nov. 5, 2003

(65) Prior Publication Data

US 2005/0096398 A1    May 5, 2005

(51) Int. Cl.
*B01F 3/08*    (2006.01)
*A61K 8/06*    (2006.01)
*C10L 1/32*    (2006.01)
*A23D 7/04*    (2006.01)
*A61K 8/00*    (2006.01)

(52) U.S. Cl. .............. 516/21; 516/20; 516/22; 516/53; 516/924; 424/401; 44/301; 426/601; 426/602; 512/2; 514/938; 514/939

(58) Field of Classification Search ........... 516/31, 516/32, 33, 34, 53, 924, 20, 21, 22; 514/937, 514/938, 939, 940; 44/301, 302; 426/601, 426/602; 512/1, 2; 106/311
See application file for complete search history.

(56) References Cited

U.S. PATENT DOCUMENTS 4,127,706 A * 11/1978 Martin et al. ............... 429/122

6,420,091 B1 *  7/2002  Nakayama et al. ......... 430/302
2002/0010267 A1 * 1/2002 Klaerner et al. ............. 525/91

FOREIGN PATENT DOCUMENTS

FR          2722707       *   1/1996
WO    WO 2005/044229 A1  *   5/2005

OTHER PUBLICATIONS

Derwent Abstract, week 199612, London: Derwent Publications Ltd., AN 1996-107644, FR 2722707 A, (Kodak Pathe SA), abstract.*
Karaman, M.E. et al., "Effects of Dissolved Gas on Emulsions, Emulsion Polymerization, and Surfactant Aggregation", J. Phys. Chem. 100:15503-15507 (1996)—month unknown.*
Craig et al., "The Effect of Electrolytes on Bubble Coalescence in Water", J. Phys. Chem. 97:10192-10197 (1993)—month unknown.*

(Continued)

*Primary Examiner*—Daniel S Metzmaier
(74) *Attorney, Agent, or Firm*—Townsend and Townsend and Crew LLP

(57) ABSTRACT

Methods for the formation of colloidal suspensions. The method includes combining an aqueous substance with a second substance that is normally immiscible with the aqueous substance, to form a mixture, and before, during or after the combining removing dissolved gases from one or both of the aqueous and second substance, whereby the aqueous and second substances mix and form a colloidal suspension. The methods for the formation of colloidal suspensions include methods for the formation of emulsions as well as particulate dispersions. The methods used to form the colloidal suspensions in accordance with the present invention produce colloidal suspensions that are stable for periods from an hour to several weeks in the absence of surfactants or stabilizing agents.

20 Claims, 15 Drawing Sheets

OTHER PUBLICATIONS

R.M. Pashley, "Attractive Forces between Uncarged Hydrophilic Surfaces: Direct Measurements in Aqueous Solution", Science, New Series, vol. 229, No. 4718 (Sep. 13, 1985), pp. 1088-1089.*

R. M. Pashley, Effect of Degassing on Formation and Stability of Surfactant-Free Emulsions and Fine Teflon Dispersions, J. Phys. Chem. B, (2003), 107:1714-1720 (published on the web Jan. 22, 2003).*

Eastoe, J., Ellis, C., De-gassed water and Surfactant-free emulsions: History, controversy, and possible applications, Adv. Colloid Interface Sci (2007), doi:10.1016/j.cis.2007.04.017 (Apr. 2007).*

* cited by examiner

PROCESS FOR THE PRODUCTION OF EMULSIONS AND DISPERSIONS

STATEMENT AS TO RIGHTS TO INVENTIONS MADE UNDER FEDERALLY SPONSORED RESEARCH OR DEVELOPMENT

A part of the research related to this invention was done at the University of California Santa Barbara's ("UCSB") Materials Research Laboratory ("MRL"), which is partly funded by a National Science Foundation ("NSF") Grant that funds the operations of UCSB's MRL. The U.S. Government may have certain rights in the invention.

RELATED PUBLICATION

The Applicant is the author of the following article directed to the subject matter of the present invention: R. M. Pashley, J. Phys. Chem. B 2003, 107, 1714-1720, "EFFECT OF DEGASSING ON THE FORMATION AND STABILITY OF SURFACTANT-FREE EMULSIONS AND FINE TEFLON DISPERSIONS."

BACKGROUND OF THE INVENTION

The present invention relates to the formation of emulsions and dispersions, and in particular, to the process of formation of stable oil emulsions and particulate dispersions of hydrophobic materials in aqueous substances.

Everyday "common knowledge" tells us that oil and water do not mix. This fact is assumed to be related to the different properties of the two materials. Oil being nonpolar is "hydrophobic" and therefore water-hating. This view is certainly valid for molecular mixtures of oil and water. Simply put, the work required to force apart hydrogen-bonded water molecules to incorporate hydrocarbon solute molecules is too large and this work is not compensated by a strong solute-water bonding, which is the case for soluble solutes such as common salt, sugar and ethanol. Each of the latter solutes can form strong bonds with adjacent water molecules, which replace those between the water molecules themselves.

Another type of mixture, not molecular in nature, can be formed by the dispersion of microscopic droplets or particles, often in water, to form a colloidal solution or dispersion. However, hydrocarbon oils and finely divided hydrophobic particles will not readily disperse in water and will only remain stable for a short length of time, typically, for less than an hour, even after vigorous mechanical agitation. Thus, most industrial processes involving these mixtures require continuous agitation and fairly rapid reaction times. The efficiency of these processes is also reduced by the difficulty in maintaining small particle sizes and a high reaction surface area, because of the tendency to coalescence and coagulation. The stability of emulsions and dispersions can be much improved by the addition of surfactants and polymers, which can change the nature of the oil/water interface. However, these observations are, at first sight, not consistent with a simple application of the well-established DLVO theory of colloid stability (J. N. Israelachvili, *Intermolecular and Surface Forces*, Academic Press (1992)). This is because oil droplets and fine, hydrophobic particles, even without additives, are known to develop significant surface electrostatic potentials in water and, in addition, generally have weak van der Waals attractive forces. These conditions usually indicate that the colloidal dispersion will be stable.

It is, therefore, of some interest to consider in more detail why hydrophobic colloids, such as fine oil droplets, fail to maintain colloidal stability in water. The molecular force or bonding argument is not valid in this case (although it is directly related to the ultimate thermodynamic stability of the colloidal solution) because colloidal dispersions can be maintained in a meta-stable state by the operation of strong repulsion forces generated between the particles or droplets. The DLVO theory is based on the assumption that it is the charge on a colloidal particle (or droplet) surface which generates a repulsive electrostatic (double-layer) force between particles, which can be of sufficient strength to overcome the ubiquitous van der Waals attractive force. These combined forces can be estimated from the theory using the measured electrostatic potential on the surface of, for example, typical hydrocarbon oil droplets and their van der Waals attraction. The surface potential of dodecane droplets (as well as some other oils) was carefully measured in 1996, (Marinova, K. G. et al., *Langmuir* 12(8):2045-2051 (1996)), and these values can be used to calculate the expected interaction energy between two oil droplets in water. In order to consider the static forces involved, reference is made to FIG. 1. FIG. 1 gives the estimated DLVO interaction energies expected for 0.3 µm radius dodecane oil droplets in water, using the simplified, i.e., linear (low potential), Poisson-Boltzmann equation, combined with a nonretarded Hamaker attraction and using the Derjaguin approximation (J. N. Israelachvili, *Intermolecular and Surface Forces*, Academic Press (1992)). This radius was selected because smaller droplets will tend to coalesce through kinetic collisions and larger droplets have a greater buoyancy force and will rapidly coalesce with the upper oil phase. Droplets of 0.3 µm radius will rise at the rate of nearly 0.5 cm per day in water.

The DLVO equation used here to calculate this interaction is given below:

$$V_s(/kT) = \frac{a}{kT}\left[2\pi \epsilon_0 D\psi_0^2 \exp(-\kappa H) - \frac{A_{121}}{12H}\right]$$

where $V_s$ is the interaction energy between spheres in kT units, "a" is the spherical radius, $\psi_0$ is the particle's electrostatic potential, $\kappa^{-1}$ is the Debye length, $A_{121}$ is the Hamaker constant for the system, and H is the interparticle separation distance. $\epsilon_0 D$ is the permittivity of water. In the dodecane/water system, the calculated barrier is almost 800 kT (see FIG. 1), which would give long-term stability to emulsion droplets of this size (Hiemenz, P. C. et al., *Principles of Colloid and Surface Chemistry*: New York (1977)). The significant surface potential reported (Marinova, K. G. et al., *Langmuir* 12(8):2045-2051 (1996)), of between −50 and −60 mV, is apparently caused by the specific adsorption of hydroxyl ions from the aqueous phase to the oil/water surface. The standard theory of coagulation of colloids (Hiemenz, P. C. et al., *Principles of Colloid and Surface Chemistry*: New York (1977)) indicates that coalescence or coagulation will become significant when the repulsive barrier approaches 10-20 kT or less. Clearly, these simple calculations indicate that fine droplets of hydrocarbon should be indefinitely stable against coalescence in water, because of a combination of surface charging via hydroxyl ion adsorption and a relatively weak van der Waals attraction, a result which is at complete variance with general observation.

Because the interparticle potential energy barrier is proportional to the droplet radius, smaller hydrocarbon oil droplets will readily coalesce, as observed for the fine droplets (less than 50 nm radius) produced by the sonication of oil and water mixtures (Sakai, T. et al., *Langmuir*, 17(2):255-259

(2001)). Larger droplets will feel a substantial buoyancy force and will readily combine with the upper phase of dodecane liquid, because it has a lower density than water. Droplets of intermediate (micron) sizes should be stable for longer periods, if only DLVO forces operate. Similar stability arguments can be applied to fine Teflon particles, which are known to be charged (Kratohvil, S. et al., *J. Colloid Interface Sci.*, 57(1): 104-114 (1976)) and have an even weaker van der Waals attraction in water (with a Hamaker constant of $0.3 \times 10^{-20}$ J) (J. N. Israelachvili, *Intermolecular and Surface Forces*, Academic Press (1992)). The failure of the DLVO theory to predict the behavior of oil in water emulsions raises the issue of whether there might be additional forces involved. About 20 years ago, a new long-range attractive force, called the "hydrophobic interaction" (Israelachvili, J. N. et al., *Nature*, 300:341-342 (1982)), was discovered which acted over relatively large distances (>10 nm) between hydrophobic surfaces in water. Subsequent workers have extended the range to over 100 nm in some systems.

In later work, it was also suggested that dissolved gases may play a significant role in this interaction (Craig, V. S. J. et al, *J. Phys. Chem.*, 97:10192-10197 (1993); Karaman, M. E. et al., J Phys. Chem. 100:15503-15507 (1996)), which has yet to be properly described by any theoretical model. At normal temperature and pressure, dissolved air in water has a concentration of around 1 mM, corresponding to about 20 mL of dissolved gas in a liter of water. In typical alkanes, gas solubility can be an order of magnitude higher. The role of dissolved gas in the properties of solutions has hardly been considered theoretically and, experimentally, only sporadically and often ignored.

In 1993, it was demonstrated that partial degassing, using a water jet pump aspirator to produce about 97% degassing for mixtures of dodecane/water, increased the stability of oil droplets on vigorous shaking (Craig, V. S. J. et al, *J. Phys. Chem.*, 97:10192-10197 (1993)). These initial observations stimulated an AFM study which attempted to address the issue of dissolved gas in the interaction of hydrophobic polypropylene surfaces (Meagher, L. et al., *Langmuir* 10(8): 2736-2742 (1994)). The polypropylene surfaces used in that study, although very hydrophobic as measured by the water contact angle, generated only a relatively short-ranged attraction measurable up to about 25 nm separations. The effect of degassing was only minor in this case. However, Horn et al. (Considine, R. F., et al., *Langmuir* 15(5):1657-1659 (1999)) reported a significant decrease in the long-range attraction (20-400 nm) between two polystyrene latexes as the level of dissolved gas in solution was reduced. In further work on emulsion stability, using a water jet pump to degas to the 97% level, it was also demonstrated that dissolved gas plays a significant role in emulsion stability and emulsion polymerization (Karaman, M. E. et al., *J. Phys. Chem.* 100:15503-15507 (1996)) and this led to the suggestion that dissolved gas may play a significant role in the balance of hydrophobic and hydrodynamic (drainage) forces responsible for the phase separation. By comparison, Zana et al. examined the effects of degassing on surfactant aggregation (Alargova, R. G. et al., *Langmuir* 14(7):1575-1579 (1998)) and microemulsions (Sierra, M. L. et al., *J. Colloid Interface Sci.* 212 (1):162-166 (1999)) and reported no effect in either case. However, this is hardly surprising because the amount of dissolved gas present in the aqueous phase, at the mM level, could not possibly be sufficient to influence these high surface area systems. Recently, a study of the coagulation rates of solid paraffin wax mixed with carboxylic acid stabilizer has shown that partial degassing (to about 97% using a water aspirator) has a significant effect on reducing the initial coagulation rates (Alfridsson, M. et al., *Langmuir* 16(26):10087-10091 (2000)). More recently, Ishida et al. (Ishida, N. et al., *Langmuir* 16(13):5681-5687 (2000)) have reported the complete absence of a long-range attraction (beyond 10 nm) from force measurements on systems that have never been exposed to dissolved gases.

Unfortunately, the literature produced over the last 20 years contains many reports of force measurements between hydrophobic surfaces with widely differing results, often depending on the preparation of the surfaces and the method used. There is therefore a need to better understand the electrostatic potential on an oil droplet or a hydrophobic particle and whether this potential is sufficient to stabilize fine droplets and to thus enable the formation of stable colloidal suspensions.

BRIEF SUMMARY OF THE INVENTION

Embodiments of the present invention are directed to methods for the formation of colloidal suspensions. In one embodiment, the present invention provides a process for the production of a colloidal suspension. The process includes combining an aqueous substance with a second substance that is normally immiscible with the aqueous substance, to form a mixture, and before, during or after the combining removing dissolved gases from one or both of the aqueous and second substance, whereby the aqueous and second substances mix and form a colloidal suspension. The methods for the formation of colloidal suspensions include methods for the formation of emulsions as well as particulate dispersions. The methods used to form the colloidal suspensions in accordance with the present invention produce colloidal suspensions that are stable for periods from an hour to several weeks.

In one embodiment, the colloidal suspensions are formed with or without mechanical action.

In another aspect, the colloidal suspension is formed in the absence of a surfactant, a polymer or a stabilizing agent.

In another embodiment, the removal of dissolved gases includes removing between 90 to 99.99% of the dissolved gases that are present in the mixture, or the components of the colloidal suspension.

In yet another embodiment, the removal of dissolved gases included the freezing of the mixture, degassing the frozen mixture and then thawing out the frozen mixture.

In one embodiment, the colloidal suspension can be a pharmaceutical treatment, a paint, a dye, a combustion fuel, a fuel additive, a food additive, a food product, a perfume, a cosmetic product, a hygiene product, a dermatological product, an insect repellent, a mineral, an emulsion polymerization, a material produced by a process using a degassed dispersion technique or combinations thereof.

For a further understanding of the nature and advantages of the invention, reference should be made to the following description taken in conjunction with the accompanying drawings.

DETAILED DESCRIPTION OF THE INVENTION

I. Definitions

Figure 1:
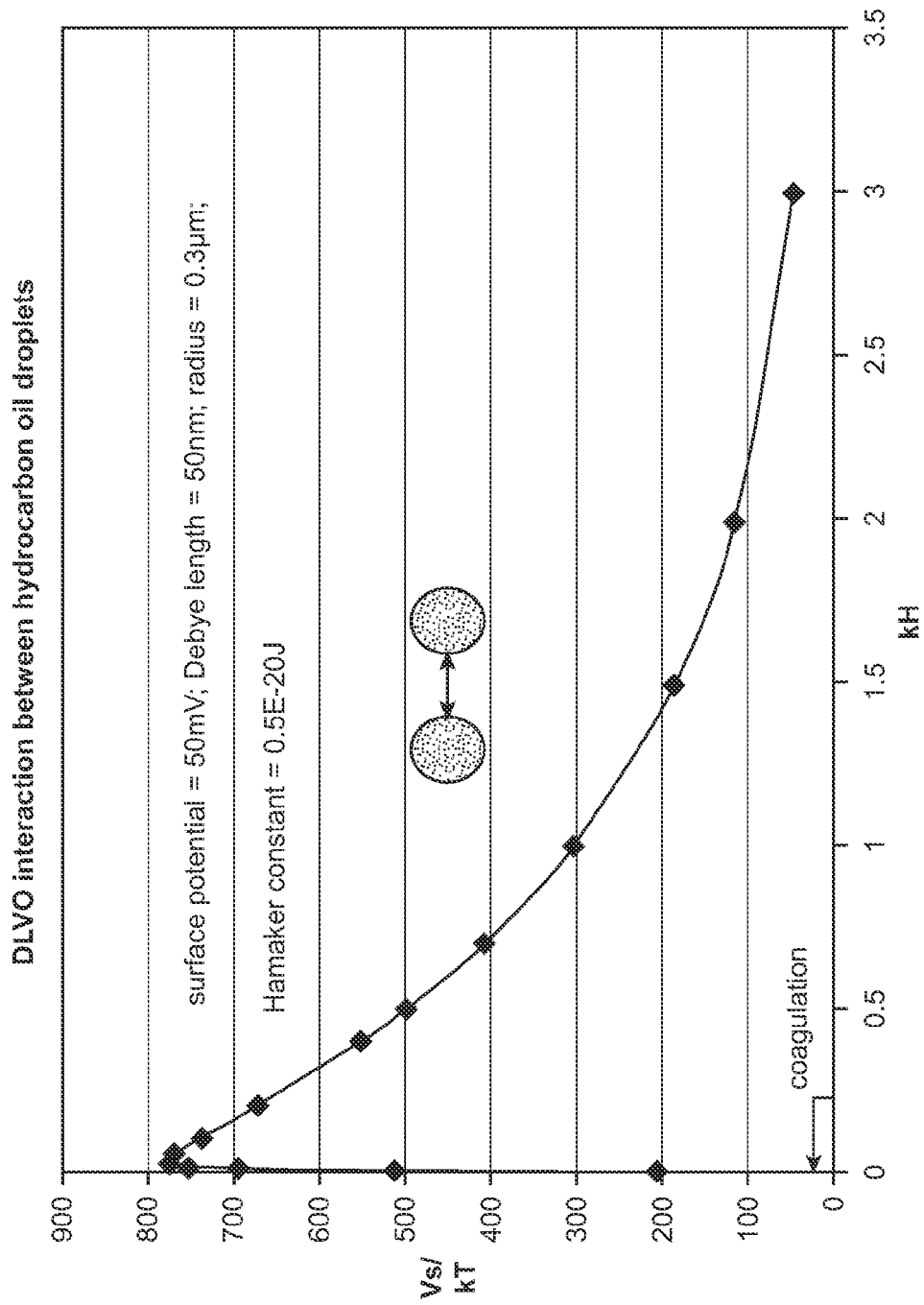
FIG. 1 is a graph of DLVO interaction force (Vs) in kT units vs. interparticle separation distance, H, showing the interaction force between hydrocarbon oil particles.

Unless defined otherwise, all technical and scientific terms used herein have the meaning commonly understood by a person skilled in the art to which this invention belongs. As used herein, the following terms have the meanings ascribed to them unless specified otherwise.

An emulsion is a mixture of two normally unmixable liquids (e.g., oil and water) in which one is colloidally suspended in the other (e.g., one exists as tiny particles within the other). An emulsion is a colloidal suspension of a liquid in a liquid. An emulsion is also known as a colloid formed from tiny liquid droplets suspended in another immiscible liquid. Milk is an example of an emulsion. Emulsions may be of two types: oil-in-water, where water is the continuous phase and water-in-oil, where water is the discontinuous phase.

A colloid is a heterogeneous mixture composed of tiny particles suspended in another material. The particles are larger than molecules but have a size on the order of between one nanometer and a few micrometers. A colloid is also defined as microscopic particles suspended in some sort of liquid medium. The particles are between one nanometer and a few micrometers in size and can be macromolecules. The particles can be solid, tiny droplets of liquid, or tiny bubbles of gas; the suspending medium can be a solid, liquid, or gas (although gas-gas colloids are generally not possible).

A colloidal dispersion is a mixture containing particles larger than those found in a solution but small enough to remain suspended for a very long time. A dispersion is usually called a colloidal solution.

An emulsifying agent is a substance that coats the particles of a dispersed phase and prevents coagulation of colloidal particles. An emulsifying agent is also known as an emulsifier.

DLVO Interaction is the Derjaguin-Landau-Verwey-Overbeek (DLVO) interaction between colloidal particles in confined domains, and which is of interest in a variety of applications involving colloidal and complex fluids, for instance, in capillary electrophoresis, chromatographic separations, particle deposition, transport of colloids through porous media, and membrane separations. The interaction between two colloidal particles in the framework of the DLVO theory may be expressed as a sum of Lifshitz-van der Waals (LW) and electrostatic double layer (EDL) interactions. Of these two interactions, the electrostatic double layer component is susceptible to immense variations with several operating and physico-chemical conditions like ionic strength of the suspending medium, the charging behavior of the interfaces, the dielectric property of the solvent, and geometry of the particles and the confining domain.

II. Methods of Forming Colloidal Suspensions

The embodiments of the present invention are directed towards a process for the production of oil emulsions and particulate dispersions, such as of hydrophobic materials in water. It is known that finely divided hydrocarbon oil droplets and fine, hydrophobic particles will not disperse in water without the addition of surfactants and polymers. These agents adsorb onto the surfaces of the finely divided materials and change their surface properties to prevent coalescence and coagulation. Without the addition of these stabilizing agents, oils coalesce and phase separate, and particles coagulate and precipitate from solution. The present disclosure provides a process which can significantly enhance both the formation and the long term stability of emulsions and dispersions—without the use of these additives. This process offers a reduction in production costs and has the potential to produce products, for example, pharmaceutical treatments, without the additional, significant drawbacks associated with side-effects caused by the use of stabilizing agents. Many industrial processes depend on the formation of stable emulsions (e.g., in food processing and in emulsion polymerization for the production of latex paints) and dispersions (e.g., in mineral separation and processing) and so the embodiments of the present invention enable processing without the current requirements for a variety of costly surfactant and polymer additives.

Figure 2:
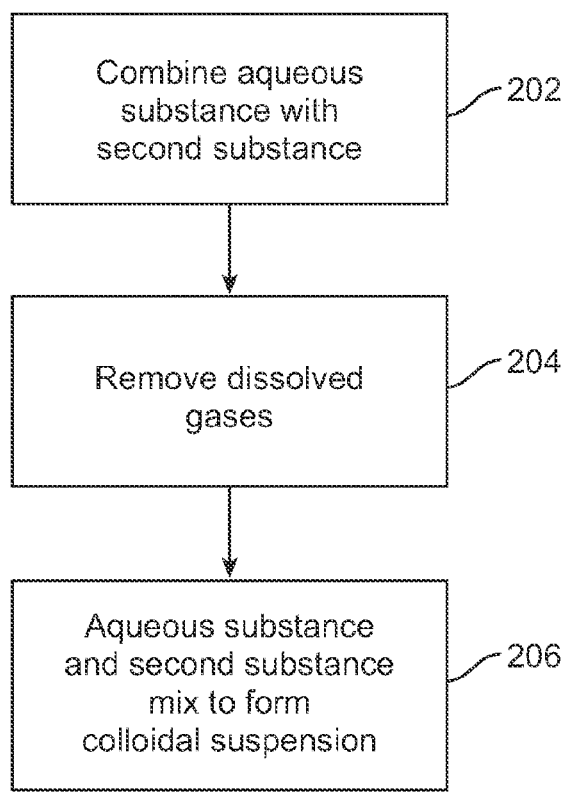
FIG. 2 is an exemplary block diagram of one embodiment of the process for the formation of emulsions or dispersions in accordance with the present invention.

The process in accordance with embodiments of the present invention is based on earlier research by the Applicant which indicated that the presence of dissolved gases enhances the attractive forces between hydrophobic surfaces in water. These forces generally prevent the formation of emulsions and hydrophobic dispersions. The inventor of the present disclosure has discovered that oil/water mixtures and fine (hydrophobic) powder/water mixtures readily form emulsions and dispersions, stable for periods of at least weeks, following a process of almost complete removal of their naturally dissolved gas (nitrogen, oxygen and carbon dioxide). The removal of dissolved gases can be achieved by a process of repeated freezing, pumping to vacuum levels and melting. FIG. 2 provides a block diagram describing an embodiment of a methods for forming a colloidal suspensions in accordance with the present invention. As is shown in FIG. 2, a colloidal suspension is formed by combining an aqueous substance with a second substance that is normally immiscible with the aqueous substance, to form a mixture (step 202); and before, during or after the combining removing dissolved gases from one or both of the aqueous and second substance (step 204), whereby the aqueous and second substances mix and form a colloidal suspension (step 206). The level of degassing that is achieved is a function of the vacuum level that is created and which is described in further detail below.

The process in accordance with the embodiments of the present invention can be applied to any hydrocarbon or fluorocarbon water-insoluble oil and water mixture and to any finely divided (typically, less than a micron diameter) solid hydrophobic powder, such as carbon black and Teflon powder, and water. The emulsions and dispersions formed by this process can be stored, indefinitely, under vacuum or can be used for some time, within hours to days, after exposure to air, depending on the type of mixture and its level of air sensitivity.

The following examples are provided to illustrate the embodiments of the present invention. They are not intended to limit the scope of this disclosure to the embodiments exemplified therein. All ranges for all parameters disclosed are inclusive of the range limits.

EXAMPLES

Preparation of Oil-in-Water Suspensions and Particulate Dispersions

The water used was produced from tap water purified via a Millipore unit. The permeate so obtained was used in a positive pressure, dust-free laminar flow cabinet. Glassware was thoroughly cleaned by first rinsing AR grade ethanol to remove any surface active material. It was then finally rinsed in Millipore water.

Dodecane (density, $\rho$, of 0.75 g/mL and refractive index, $n_D$, of 1.4216) and squalane, tetracosane, 2,6,10,15,19,23-hexamethyl-squalane, $C_{30}H_{62}$ ($\rho$ of 0.81 g/mL and $n_D$ of 1.4530) were chosen as the two hydrocarbon oils for the examples and were both obtained puriss from Fluka and were used as purchased. All mixtures were made up in a laminar flow cabinet. The surfactant-free Teflon powder was obtained as a sample from DuPont. The size range was on average around 4 microns, with a small proportion (about 10%) above 8 microns and below 0.3 microns. Teflon has a refractive index of 1.359 (J. N. Israelachvili, *Intermolecular and Surface Forces*, Academic Press (1992)) and a void-free polymer density of 2.2-2.3 g/mL. The nitrogen adsorption area for the Teflon powder was in the range 7-10 $m^2/g$, which is an order of magnitude higher than the calculated value for smooth Teflon spheres. It is most likely, therefore, that the Teflon powder sample used here was porous.

Figure 14:
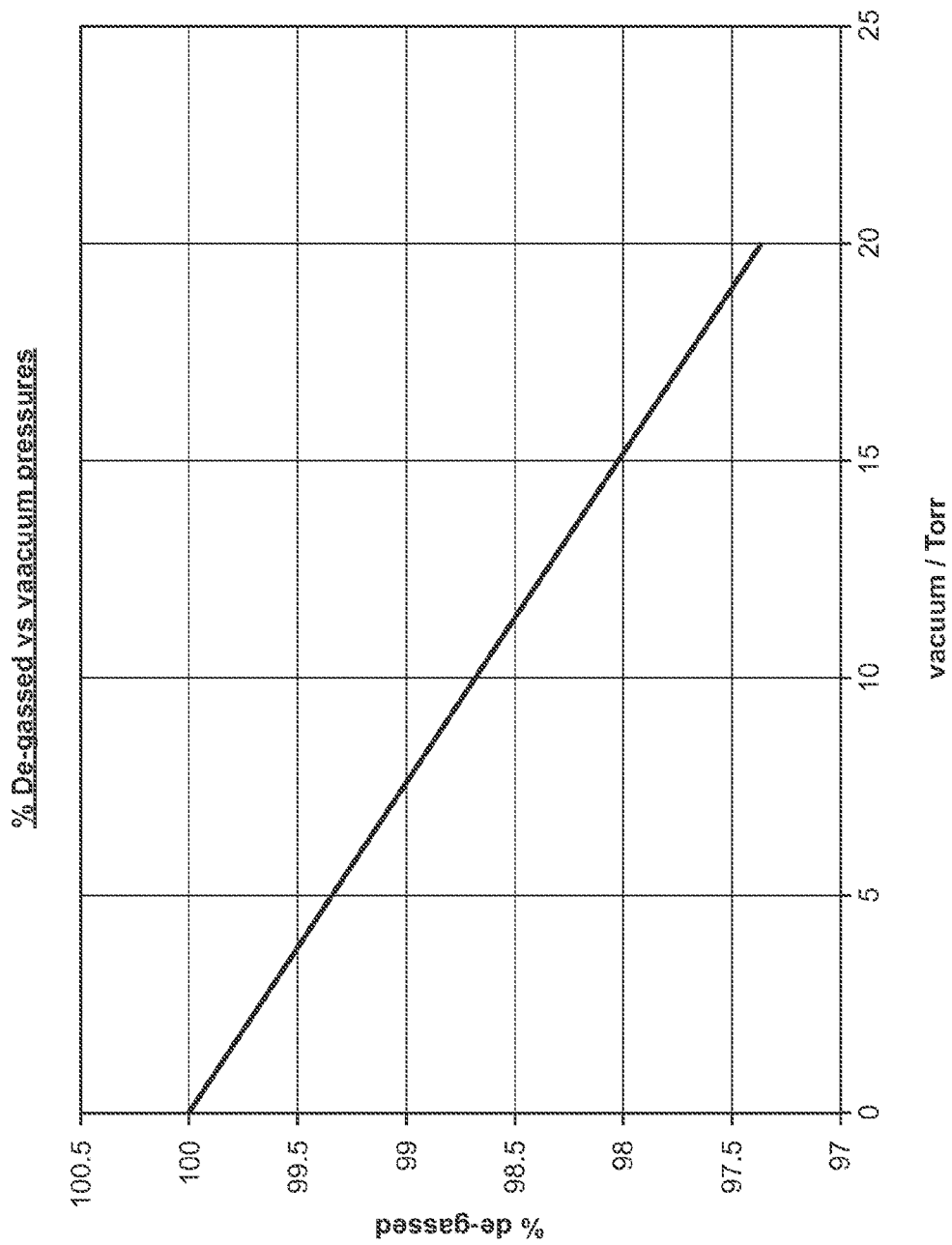
FIG. 14 is a graph of % degassing vs. pressure for the pressure range lower than 20 Torr.
Figure 15:
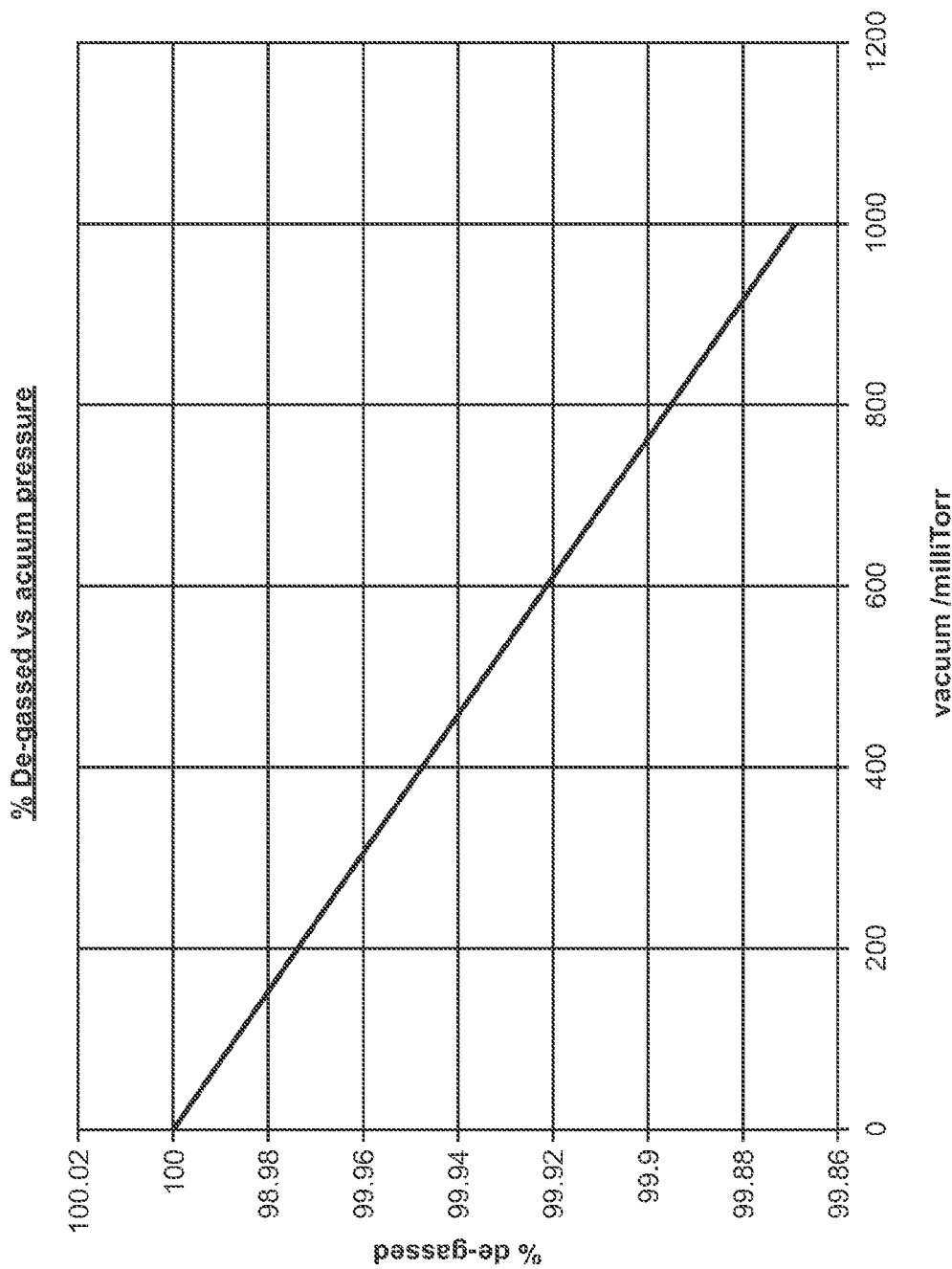
FIG. 15 is a graph of % degassing vs. pressure for the pressure range lower than 1000 milliTorr.

The removal of dissolved gas from an oil and water mixture can be achieved by repeated freezing (in liquid nitrogen) and pumping using an efficient, clean mechanical pump connected to the mixture via a liquid nitrogen trap, to maintain cleanliness. In the examples disclosed herein, the liquid mixture was immersed slowly into the liquid nitrogen, to prevent ice expansion from cracking the glass tube. Once the space above the frozen liquid was outgassed, to typically better than a mTorr, a Teflon tap was closed and the liquid warmed to room temperature, so that remaining dissolved gases were pulled into the space above the liquid. For each sample, this process was repeated four times to ensure almost complete removal of the dissolved gas. When connected to a separate vacuum line, of substantially larger volume, the mechanical pump readily achieved pressures down to 20-40 $\mu$Torr. Evacuation of the mixtures to lower than a mTorr corresponds to greater than 99.999% removal of dissolved gas. As shown in FIGS. 14-15, evacuation of the mixtures to lower than about 20 Torr corresponds to greater than 97% removal of dissolved gasses, and evacuation of the mixtures to lower than about 20 milliTorr corresponds to greater than 99.99% removal of dissolved gasses.

To directly compare the effect of degassing, nitrogen gas was bubbled through the control or gassed samples to remove dissolved carbon dioxide and increase the pH value of the aqueous phase to 7, in agreement with that of the degassed samples. Otherwise, differences in pH values between the gassed and degassed samples might affect the surface charge on the oil droplets.

For the oil in water experiments, the glass tubes contained 2 mL of oil and 33 mL of water. For the Teflon study about 0.1 g of powder was placed in the bottom of the glass tube via a fine Teflon tube and about 35 mL of water added.

In some of the examples using dodecane and water mixtures, the outgassed tubes were sealed using a Teflon screw tap. However, it was discovered that these taps did not fully hold the vacuum (see Results section below), and hence, all other examples were carried out via melt-sealing of the glass tube, using a propane/air flame, while the mixture was held frozen in liquid nitrogen and connected to the active pumping system.

The diameter of the outgassing tubes was selected to fit tightly inside the measuring cavity of a Micro 100 Turbidimeter (Nephelometer, from HF Scientific, Inc, USA). The device measured turbidity via detection of the amount of scattered light at right angles to an incident beam of white light. The turbidity of the aqueous phase of each sample was measured in Nephelometer Turbidity Units (NTU), where distilled water has a value of 0.02 and reservoir water typically 1-5.

For some of the examples, the degassing tubes were shaken vigorously by hand for about 10 s, to mechanically disperse the emulsion or dispersion. However, some samples spontaneously dispersed during degassing, without the need for additional shaking.

Results: Oil-in-Water Examples

Figure 3:
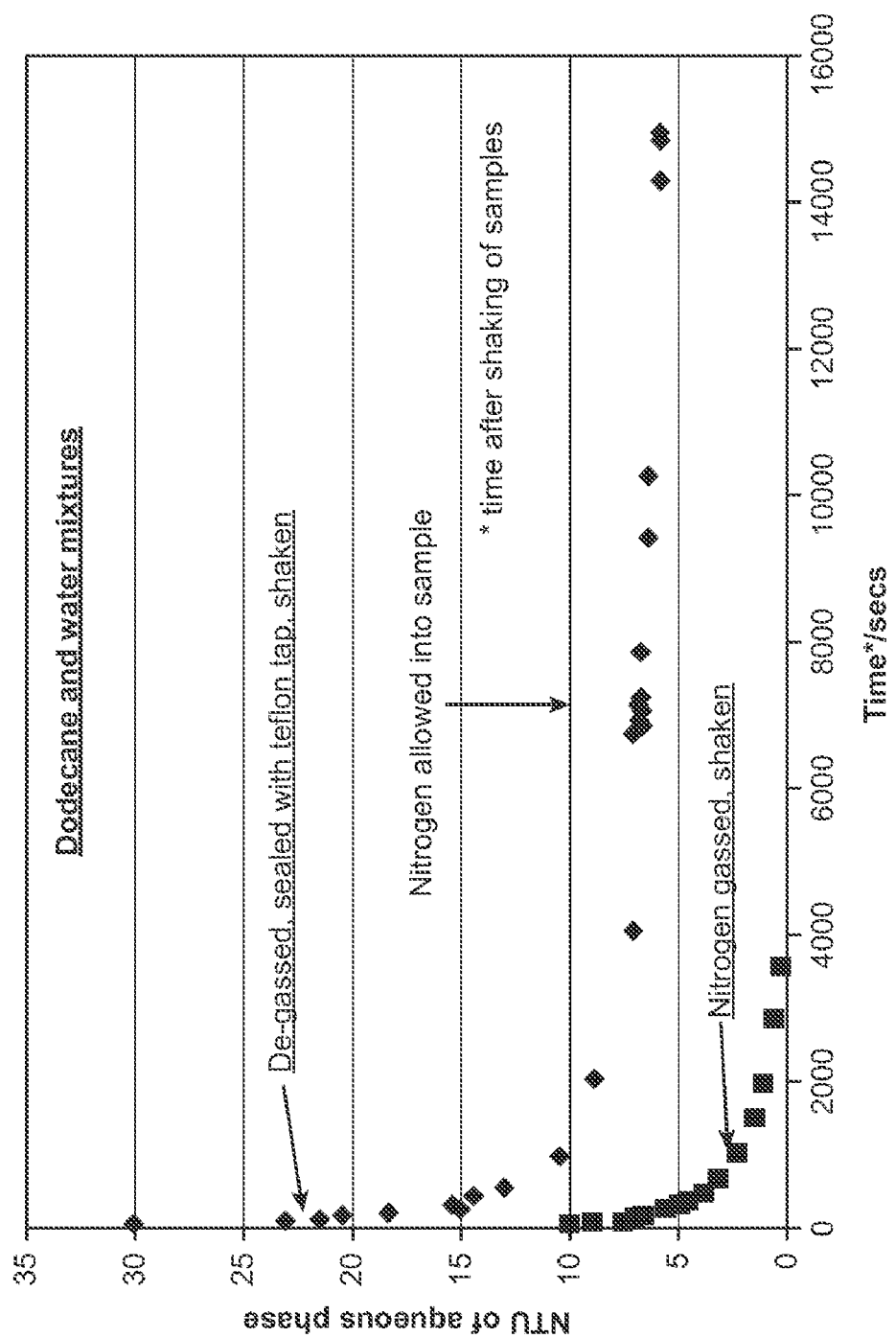
FIG. 3 is a graph showing a comparison of the turbidity (in NTU units) vs. time (in seconds) of dodecane and water mixtures after shaking, for degassed mixtures and after bubbling with nitrogen gas.

It is noted that even after only two cycles of freezing and pumping with a mixture of 33 mL water and 2 mL dodecane, the water phase became noticeably cloudy, without any mechanical shaking other than the mixing caused by gentle bubbling as the frozen (pumped) sample was allowed to warm to room temperature. After five cycles, the glass tube was sealed tightly using the Teflon screw tap. Without any external shaking, the water phase, on final melting of the outgassed solid, had an NTU value of over 50 and was completely opaque. The change in turbidity with time after this sample was vigorously shaken for about 10 s is shown in FIG. 3. Also, in this figure, for comparison, is the corresponding curve for a nitrogen-saturated mixture (in the same type of glass tube and with the same liquid volumes) which was also vigorously shaken by hand for about 10 s. Prior to shaking, the water phase had an NTU value of about 0.06. The time plotted in FIG. 3, in this case, was time after shaking. The nitrogen equilibrated mixture returned to the clear, two phase mixture within about an hour, whereas the degassed mixture was always much more turbid and maintained turbidity for a much longer period of time. After about 2 h, the degassed tube was opened and nitrogen gas let in. The results shown in FIG. 3 clearly demonstrate that exposing the surfactant-free emulsion to dissolved gas after it has been formed has little or no effect on its stability. Forty-eight hours after shaking and exposure to gas, the aqueous phase still remained slightly turbid, with an NTU value of 2.3. Even after standing for 310 h, the NTU value of the aqueous phase was 0.35, significantly above the nitrogen blank value of 0.06.

Figure 4:
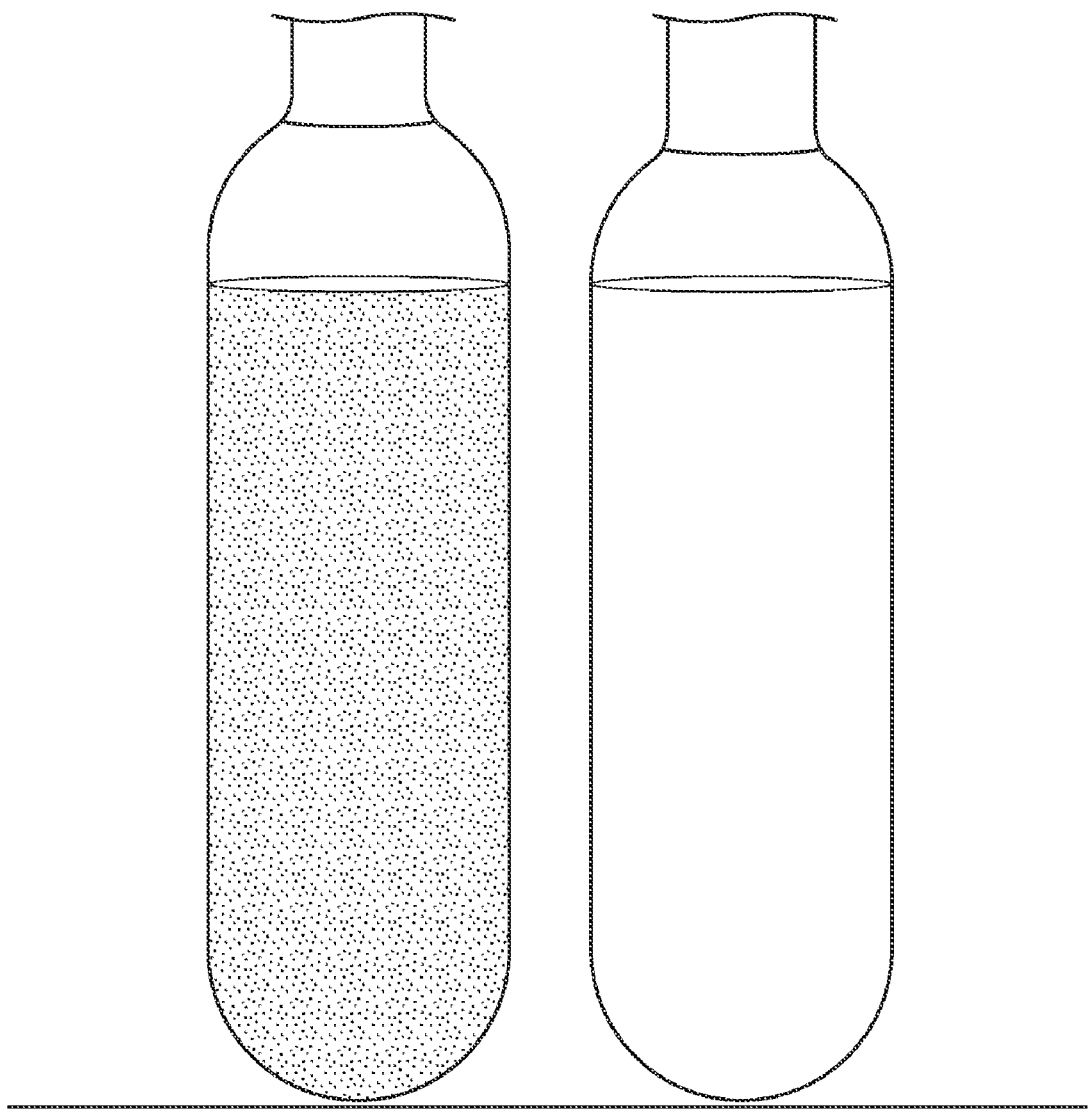
FIG. 4 is a photograph of degassed and nitrogen gassed docecane/water mixtures.

Concerns about the ability of the Teflon screw taps to maintain a vacuum for long periods of time, led to repeat experiments with dodecane/water mixtures, in which the outgassed sample was melt-sealed under vacuum. This protocol was then followed in all of the subsequent experiments reported here. An example of the spontaneous turbidity of the aqueous phase of dodecane/water mixture, following five freezing/degassing cycles and after melt-sealing is shown in FIG. 4, together with a nitrogen equilibrated sample, for comparison. As shown in FIG. 4, the tube on the left corresponds with a degassed and sealed mixture obtained without shaking having an NTU of about 53. The tube on the right shows a nitrogen equilibrated mixture also without shaking having an NTU of about 0.06. The image was obtained after the solid in the tube in the left had completely melted, following five stages of degassing (via freeze/thaw process using liquid nitrogen) and heat sealing under vacuum conditions. Both tubes contain a mixture of 33 ml water and 2 ml dodecane. Both tubes were exposed to similar, modest degrees of turbulence, because nitrogen gas was bubbled through the gassed mixture, for a similar time. The differences are clearly visibly, the degassed mixture had a uniform turbidity in its aqueous phase, whereas the aqueous phase of the gassed mixture remained optically clear.

Figure 5:
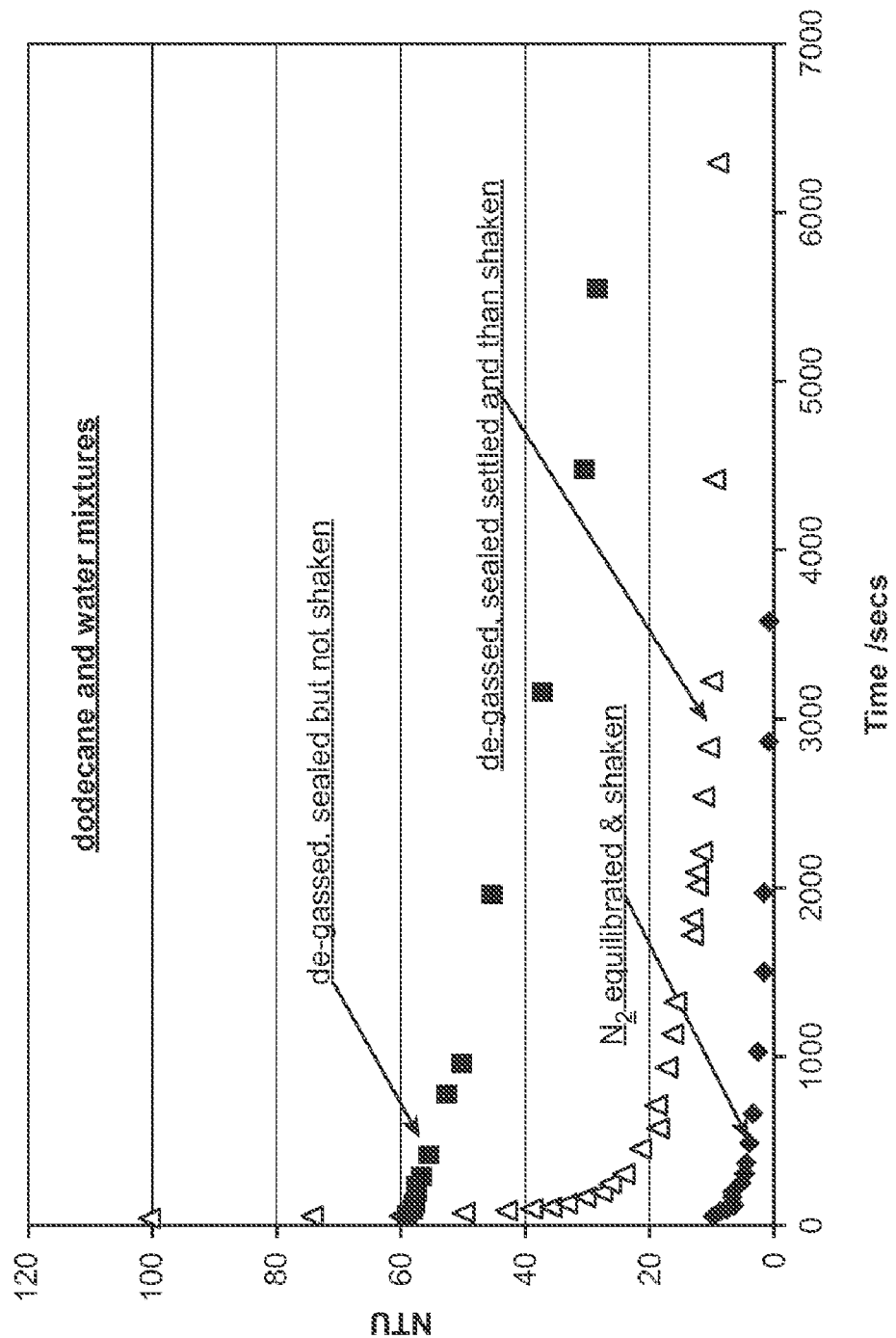
FIG. 5 is a graph showing a comparison of the turbidity values (in NTU units) vs. time (in seconds) for dodecane and water mixtures, for: degassed, sealed, and not shaken; degassed, sealed and shaken; and nitrogen equilibrated and shaken sample.

FIG. 5 provides a comparison of the turbidity of the aqueous phase of dodecane/water mixtures under various conditions: on degassing but without any additional shaking; on shaking of the degassed sample, after it has been left to settle for several days and the blank nitrogen equilibrated mixture, after shaking. Clearly, both the spontaneous emulsion, obtained by degassing, and the degassed sample, shaken after settling, were significantly more turbid and remained so for a much longer period of time, than the gassed mixture. Further, the spontaneously formed emulsion decayed much more slowly. For example, after 92 h its NTU value had fallen to 3.6 and after 262 h to 1.33, still much higher than the nitrogen (blank) value of 0.06. By comparison, the vigorously shaken sample, after only 50 h, had an NTU value of 2.6.

It is interesting to note that vigorous shaking appears to produce more turbid emulsions, initially, for the degassed samples compared with those degassed but not shaken. However, the latter were found to be much more stable with time, as shown in FIG. 5 and in the squalane results discussed below. It seems reasonable that shaking produces greater numbers of large oil droplets which act as scavengers and "collect" many of the smaller droplets. The more gentle disturbance of the oil/water interface, inevitable during five cycles of freezing and degassing, seems to create a finer distribution of oil droplets (see FIG. 4), which remains stable for much longer.

Figure 6:
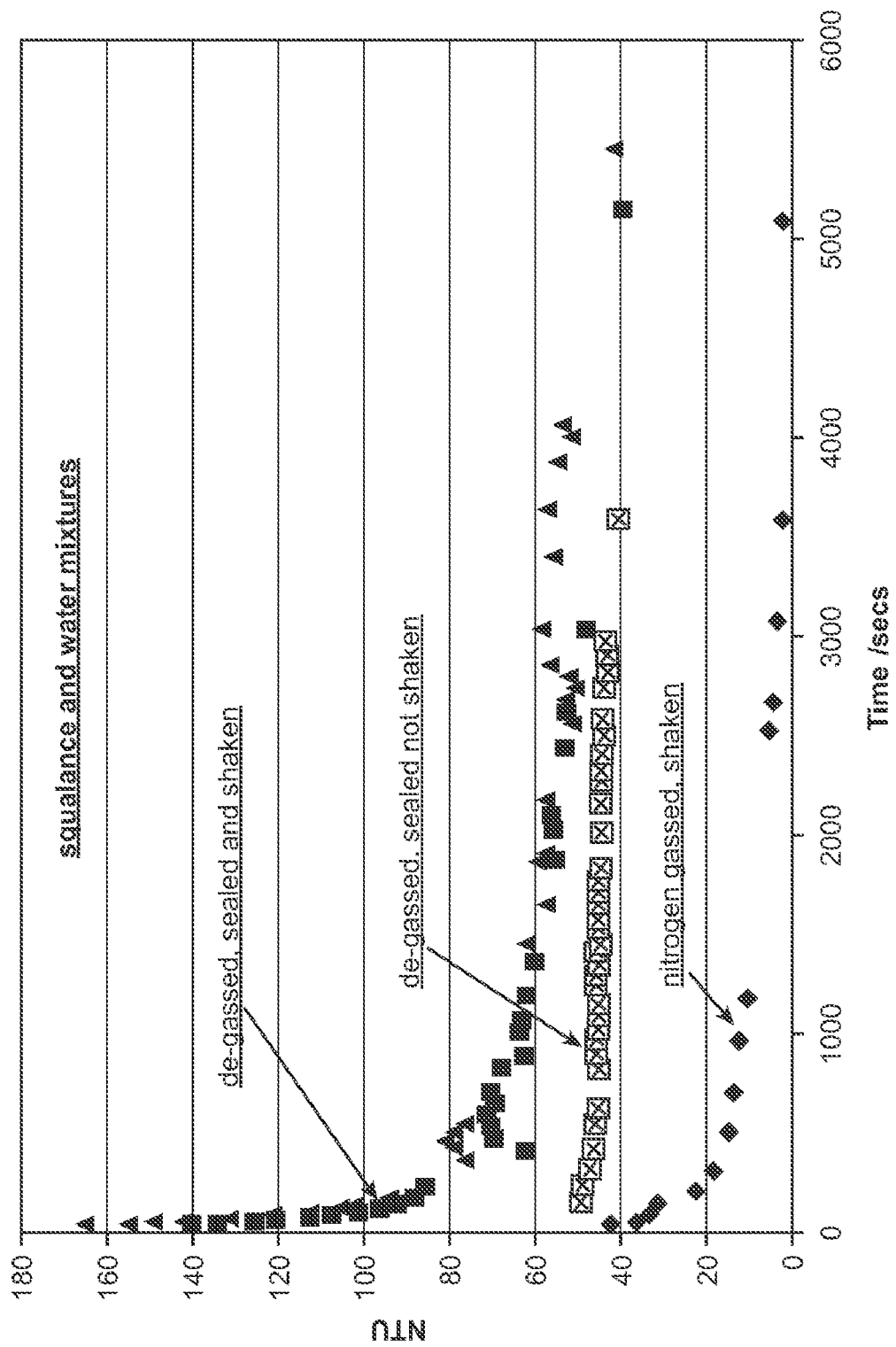
FIG. 6 is a graph showing a comparison of the turbidity (in NTU units) vs. time (in seconds) for squalane and water mixtures, for: degassed, sealed and not shaken; degassed sealed and shaken; and nitrogen equilibrated and shaken samples.

To test the generality of the above-described results, a significantly different hydrocarbon oil, squalane, was chosen for further study. Squalane is even less soluble in water than dodecane and is significantly more viscous. It is a clear liquid less dense than water. The results obtained with this hydrocarbon, shown in FIG. 6, reflect those obtained with dodecane. Once again the degassed state produced a much more turbid and stable emulsion in the aqueous phase, either spontaneously formed following the degassing procedure or after vigorous shaking. After 22 h, the spontaneous aqueous emulsion was still visibly turbid, with an NTU value of 10.6. In comparison, the shaken sample decayed more rapidly initially, as for the dodecane mixture, and reached an NTU value after 46 h of 6.9.

Figure 7:
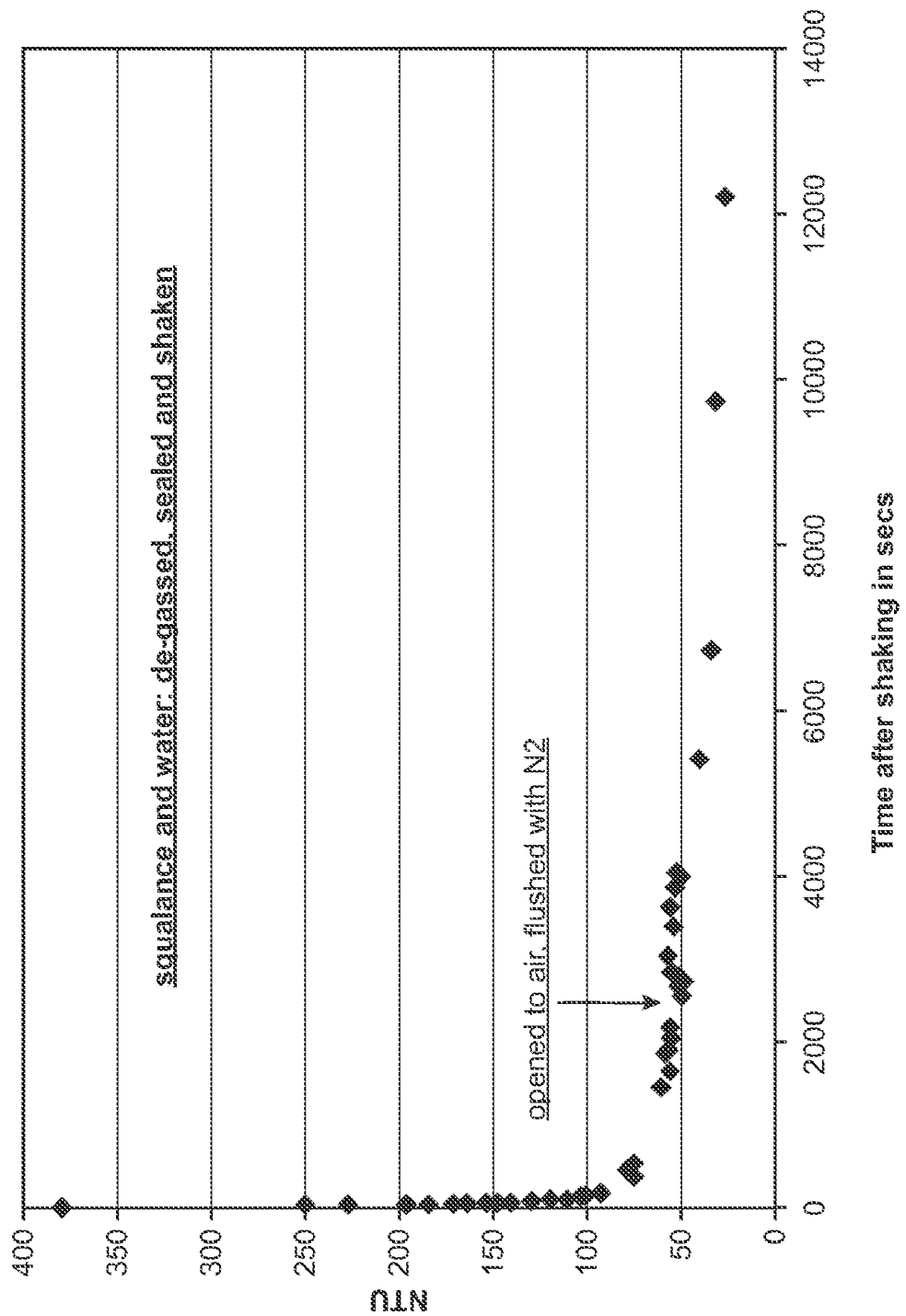
FIG. 7 is a graph showing turbidity values (in NTU units) vs. time (in seconds) for squalane and water mixtures after degassing, sealing and shaking, and where after 2400 sec. the mixture was opened to the air, the space above the liquid was flushed with nitrogen, and the tube was resealed.

In a repeat experiment, the degassed, melt-sealed and shaken mixture was opened in air about 2400 s after shaking. The sealed glass tube was cracked open in air, as carefully as possible, and immediately nitrogen gas was flushed into the air space above the mixture and the tube was then re-sealed with a rubber bung. The results obtained before and after exposure to gas are shown in FIG. 7. Although initially, after opening, there was a slight increase in turbidity, probably because of the unintended disturbance to the mixture during the opening of the tube, the results clearly show, again, that once the surfactant-free emulsion is formed, exposure to dissolved gas does not destabilize the emulsion.

Figure 8:
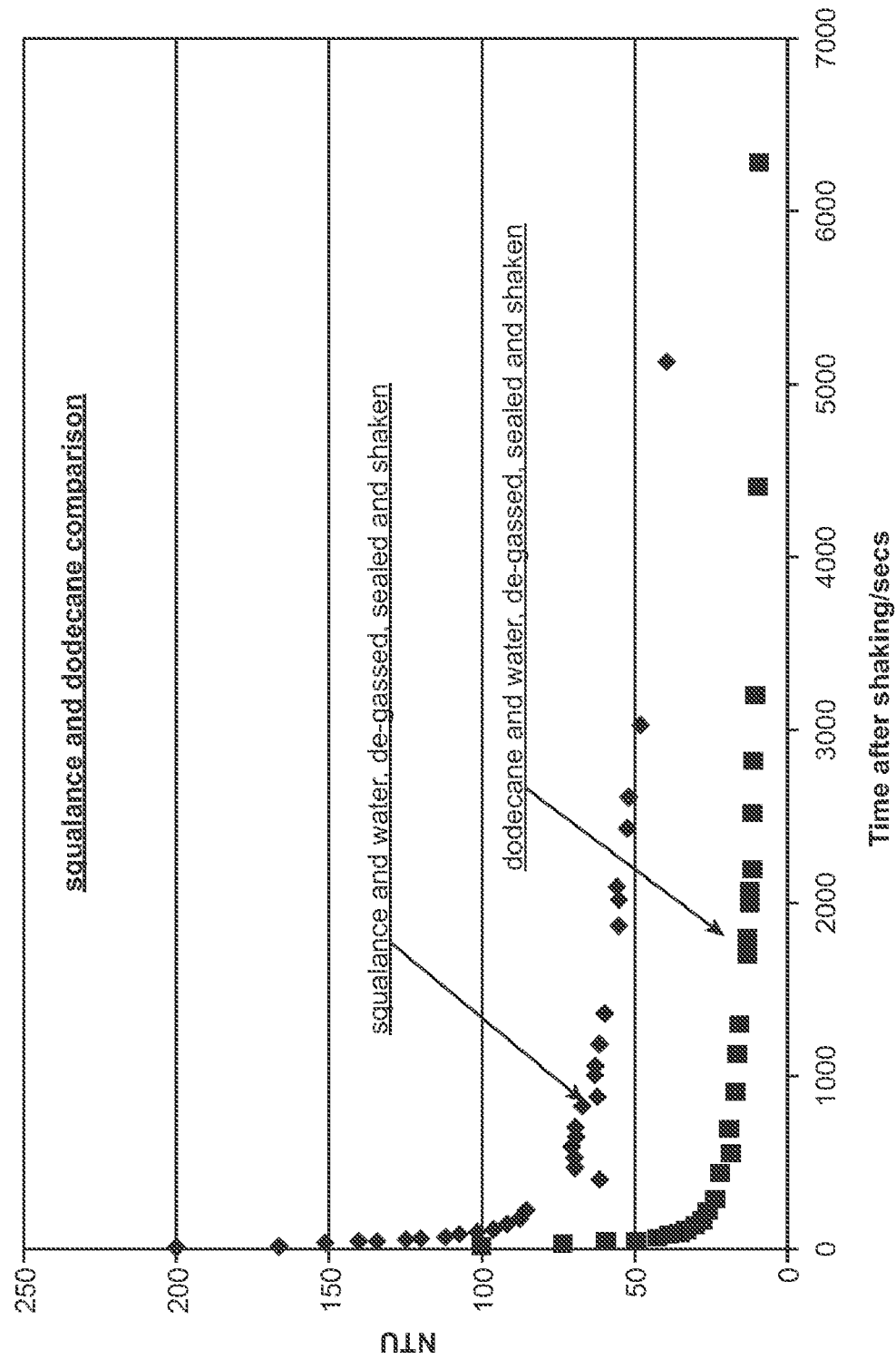
FIG. 8 is a graph showing a comparison of turbidity values (in NTU units) vs. time (in seconds) for dodecane and squalane after degassing, sealing and shaking.
Figure 9:
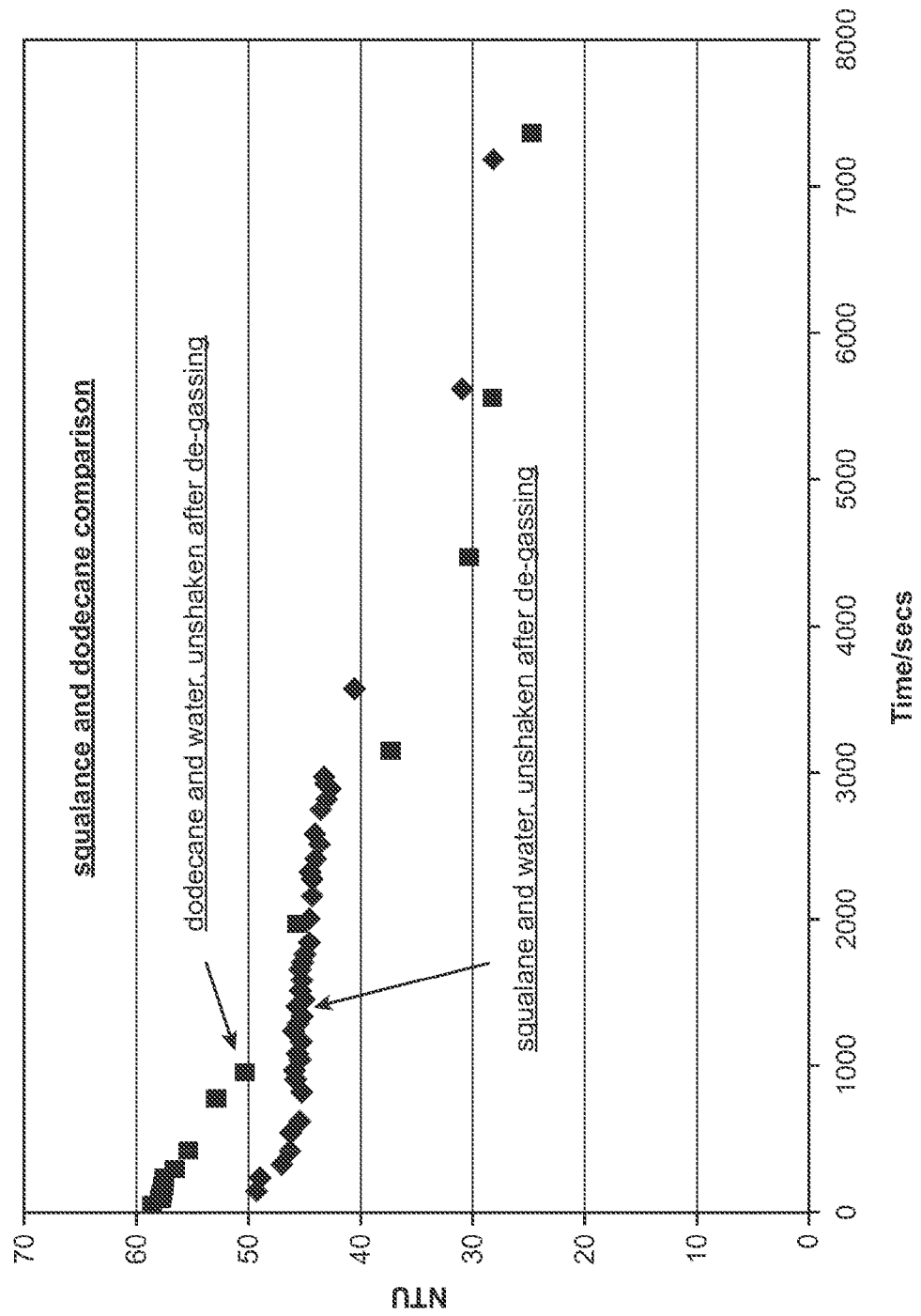
FIG. 9 is a graph showing a comparison of turbidity values (in NTU units) vs. time (in seconds) for dodecane and squalane after degassing, and without shaking.

FIG. 8 gives typical comparison curves for the decay in turbidity with time for squalane and dodecane mixtures, after shaking. The rates of decay are quite similar, although it is clear that squalane droplets produce much more turbid emulsions than dodecane. FIG. 9 gives the corresponding comparison for the spontaneous emulsions, formed following the degassing process, without additional shaking. Again, the behavior is quite similar, with a greater turbidity, initially, for squalane.

Results—Particulate Dispersions

Figure 10:
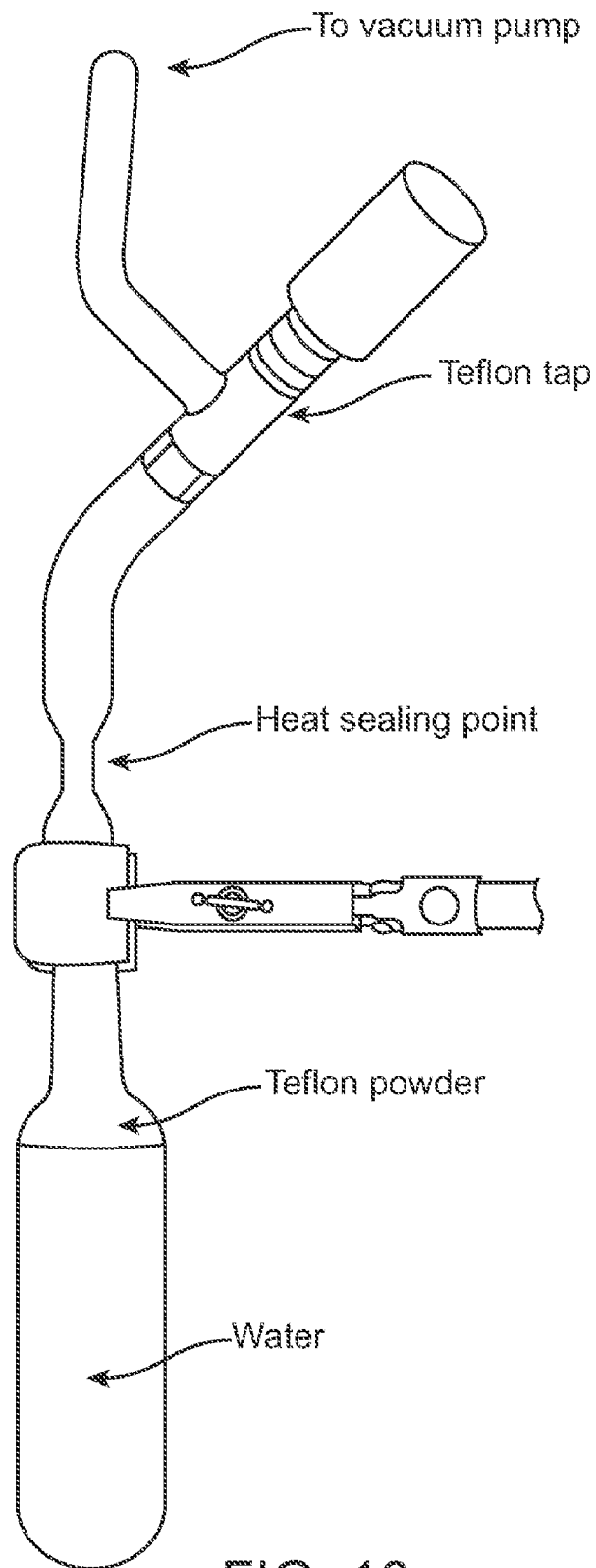
FIG. 10 is a photograph of the degassing tube containing water and Teflon powder prior to degassing.
Figure 11:
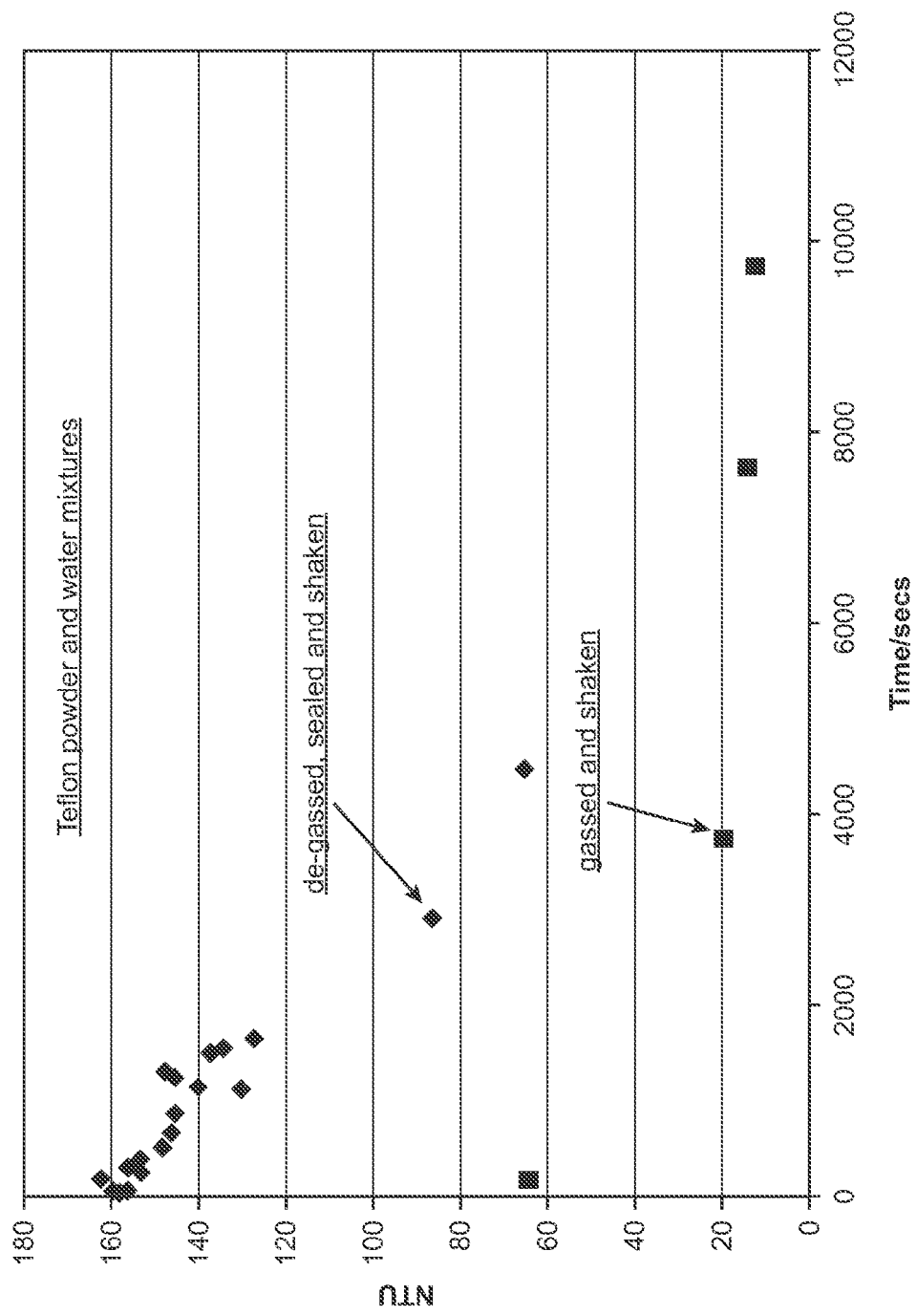
FIG. 11 is a graph showing a comparison of turbidity values (in NTU units) vs. time (in seconds) for Teflon dispersions after degassing and nitrogen equilibration.

The same type of degassing experiments were also carried out with hydrophobic Teflon powder. These experiments were more difficult than those with the oil and water mixtures. Even when Teflon powder was physically placed in the base of the dry degassing tube, addition of water immediately floated the powder to the air surface and the material "climbed" the glass walls, as shown in FIG. 10. The process must involve flotation because void-free Teflon, at 2.2-2.3 g/mL, is much denser than water. Following, precisely, the same degassing procedure used for the oil/water experiments, the results shown in FIG. 11 were obtained for Teflon dispersions. Once again, the degassed dispersion gave a much higher turbidity than the gassed case. However, these results need careful consideration because it was observed that for the nitrogen-gassed mixture, shaking produced a transient cloudy dispersion of clearly visible, large, white aggregates which generally rose in the tube after shaking. By comparison, for the degassed case, some of the clearly visible aggregates fell and some rose. In both cases, much of the Teflon powder remained at the top of the tube, at the surface and walls as shown in FIG. 10, even after vigorous shaking. However, on degassing, more of the Teflon was forced into the aqueous phase. Degassing clearly had an effect on the buoyancy of the powder, which tends to dominate its dispersion properties.

Figure 12:
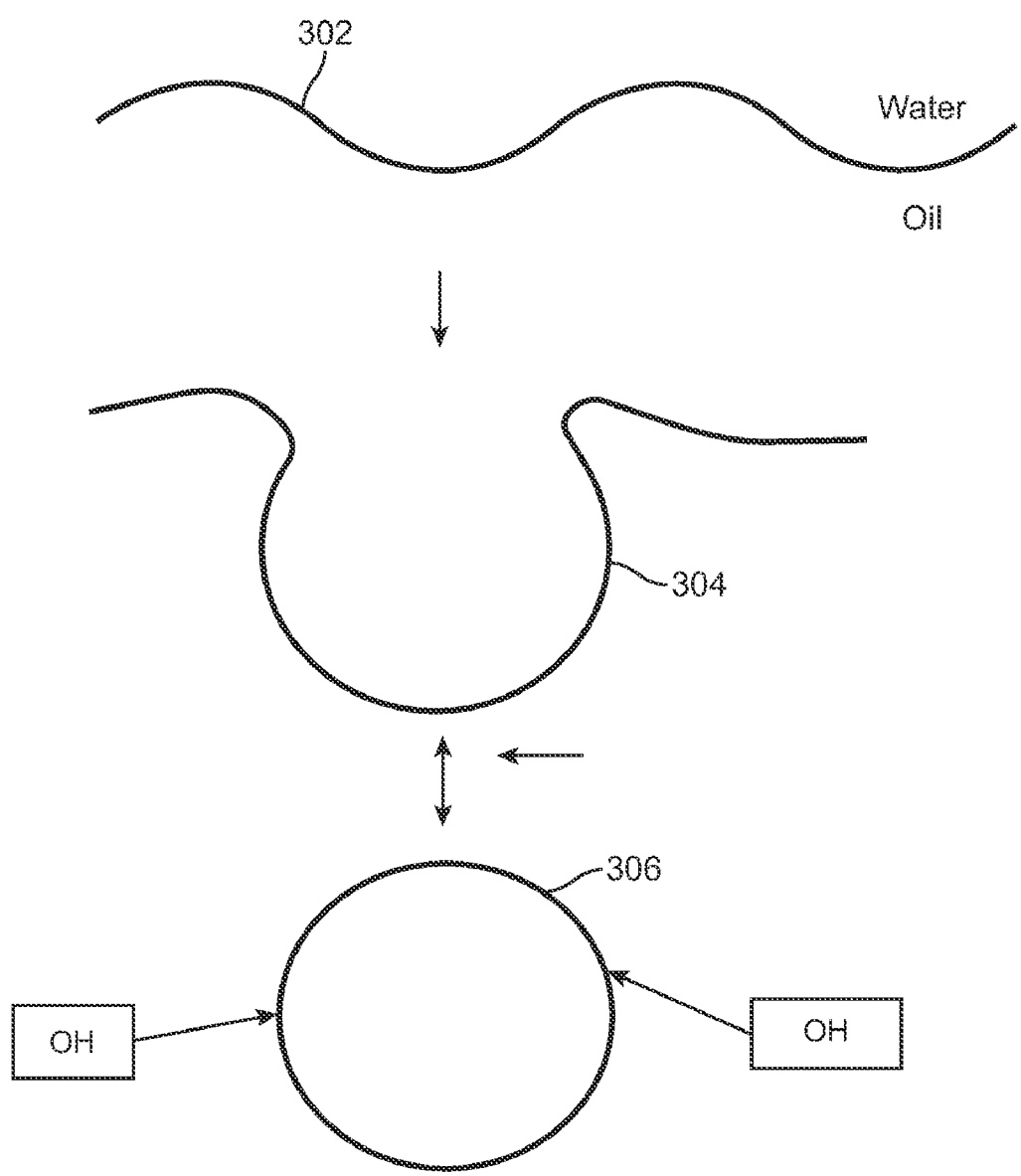
FIG. 12 is a schematic diagram of an exemplary break off of oil droplets from a water/oil interface.

Based on the results disclosed above, it appears that removal of dissolved gases enhances the ability of oil droplets to break away from the oil phase, even with modest mechanical disturbance, as illustrated in FIG. 12. FIG. 12 shows an oil-water interface 302. Once an oil droplet begins to form 304, successful droplet release depends on the strength of the hydrophobic attraction, which as is suggested by the results disclosed above, is reduced by degassing. Once these droplets have been created 306, adsorption of hydroxyl ions will be expected to produce a substantial electrostatic potential of at least −50 to −60 mV, which when combined with the relatively weak van der Waals force, should lead to emulsion stability (see FIG. 1), with an expected barrier of nearly 800 kT. Although the results disclosed above demonstrate a dramatic effect of degassing on the formation of emulsions, their long-term stability can be affected by droplet coalescence and Ostwald ripening, as well as by simple buoyancy effects. However, the similarity in turbidity behavior of dodecane and squalane degassed emulsions, even though the solubility of squalane in water is significantly lower than dodecane, suggests that Ostwald ripening is unlikely to be the main process for the observed change in turbidity. In addition, it appears from the estimated magnitude of the DLVO barrier (see FIG. 1) that droplet coalescence is also unlikely to occur. Also, the observation that exposing emulsions to dissolved gas has no effect on stability (see FIGS. 3 and 7) indicates that any hydrophobic attraction between equilibrated oil droplets, in either gassed or degassed conditions, is insignificant relative to the magnitude of the electrostatic repulsion. Thus, it seems likely that the observed slow reduction in turbidity may be simply due to the loss of droplets under the action of gravity.

The clear differences in formation of the emulsions in gassed and degassed conditions is due to differences in their ease of formation. Thus, removal of dissolved gases apparently aids detachment of, presumably, weakly charged oil droplets, which would otherwise readily coalesce. However, once these droplets are formed, their charge increases and a significant barrier is formed against coalescence. Reintroduction of dissolved gases at this, later, stage then has little or no effect. The diffusion of hydroxyl ions to the rapidly formed, new droplet surface will be relatively slow, because of the low background concentration, of typically $10^{-7}$-$10^{-8}$ M.

It is interesting to observe that the use of charged surfactants to stabilize emulsions, via adsorption at the oil/water interface, might well be effective more because of the consequent reduction in hydrophobicity of the interface, via rapid surface diffusion, rather than to any enhancement of the surface charge. Nonionic surfactants may also stabilize emulsions by reducing the hydrophobic attraction between droplets. Of course, both types of surfactant will also substantially reduce the interfacial energy and change the thermodynamic stability of the emulsion.

Figure 13:
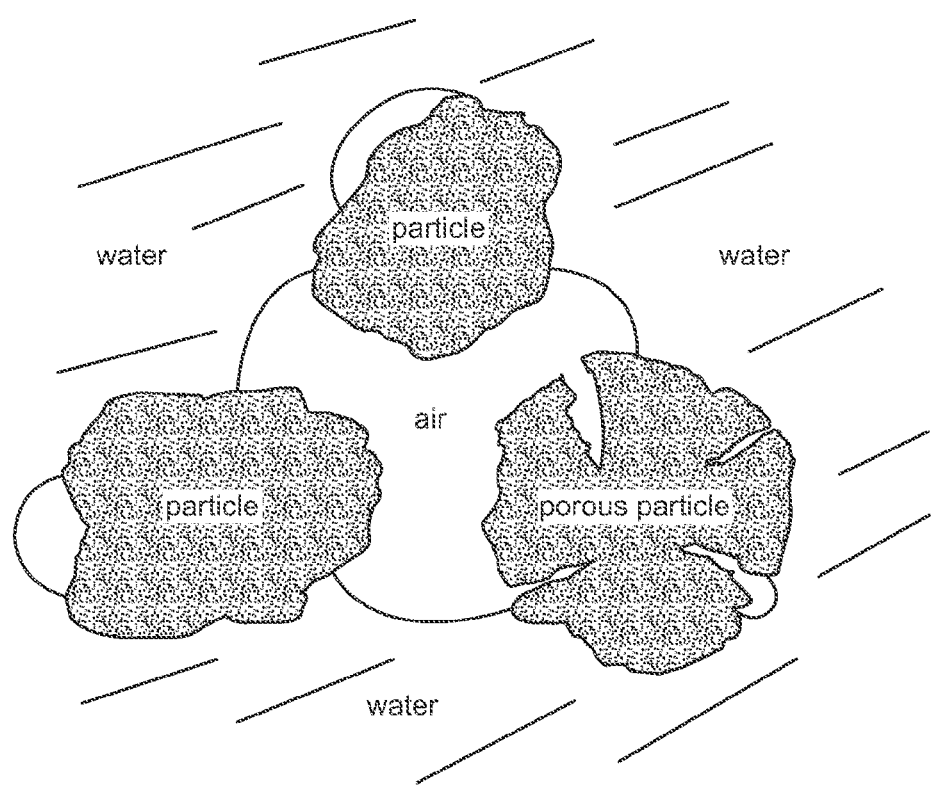
FIG. 13 is a schematic diagram of an exemplary air and vapor entrapment and attachment corresponding with hydrophobic particle dispersions in water.

The initial results set forth above for the effect of degassing on Teflon dispersions are difficult to interpret because of the strong hydrophobicity of Teflon and its effect on the buoyancy of the particles. The observation that the larger Teflon aggregates were easy to see dispersed in water for both the gassed and the degassed samples suggests that in both cases the particles contained significant air or vapor cavities. The refractive index of the polymer (1.359) is close to that of water (1.33), and yet the aggregates, when immersed in water, were clearly white. Also, the particles, after dispersion, mostly rose upward, even though the polymer density is between 2.2 and 2.3 g/mL. The Teflon particles are most likely quite porous, and it is reasonable to expect that the high water contact angle, of 110°, would produce air or vapor cavitation around clumps of particles and within the porous particles themselves, as illustrated in FIG. 13. Degassing did enhance dispersion, but this could have been, in part, because of a buoyancy effect keeping the gassed particles at the water surface (for example, see FIG. 10). Unlike oil emulsions, Teflon dispersions seem to be dominated by buoyancy effects. It was clear that, even for degassed Teflon dispersions, the particles often floated and must therefore contain more then their own volume of attached vapor bubbles and cavities. Thus, the interaction between these particles and their stability must be dominated by the attached gas and vapor bubbles. The presence of dissolved gas appears not to be so important for these systems because of their ability to form vapor cavities, even in the absence of dissolved gases. It is believed that hydrophobic particles with contact angles less than 90° should be more dependent on dissolved gas.

The discovery by the Applicant that removal of dissolved gases strongly enhances the formation of surfactant-free emulsions and hydrophobic dispersions is applicable to any hydrocarbon or fluorocarbon water-insoluble oil and water mixture and to any finely divided solid hydrophobic powder, such as talc or carbon black. These surfactant and polymer free emulsions and dispersions can be stored, indefinitely, under vacuum or can be used for some time, within hours to days, after exposure to air. Using this process, it is possible to form oil in water emulsions without the use of additives, which will enable further study of the properties of the natural oil/water interface. Therefore, there are numerous industrial applications for the processes in accordance with the embodiments of the present invention, for the formation of emulsions without the use of surfactants and polymer stabilizers. These industrial applications include the formations of colloidal suspensions for a pharmaceutical treatment, a paint, a dye, a combustion fuel, a fuel additive, a food additive, a food product, a perfume, a cosmetic product, a hygiene product, a dermatological product, an insect repellent, a mineral, an emulsion polymerization, a material produced by a process using a degassed dispersion technique and combinations thereof.

The embodiments of the present invention described above in conjunction with the examples disclosed herein demonstrate that degassing enhances the formation of oil in water emulsions and the dispersion of fine hydrophobic particles in an aqueous substance, without the use of stabilizers, such as surfactants and polymers. While not being limited to any particular theory, it is believed that once dispersed, hydrocarbon emulsion droplets apparently become charged and are not then destabilized by exposure to dissolved gases. This suggest that the reduction in the hydrophobic attraction between oil droplets in degassed water enhances droplet release and emulsion formation. Emulsions formed in accordance with the embodiments of the present invention are also usable for the study of the oil/water interface, without the presence of surface active additives. In addition, there are many useful industrial applications of the degassing process in accordance with the embodiments of the present invention, whereby stable mixtures and dispersions of hydrophobic materials are formed without the use of additives.

As will be understood by those skilled in the art, the present invention may be embodied in other specific forms without departing from the essential characteristics thereof. For example, the degassing may be performed before, during or after combining the aqueous and second substance. These other embodiments are intended to be included within the scope of the present invention, which is set forth in the following claims.

What is claimed is:

1. A process for the production of an oil emulsion, comprising:
   combining an aqueous liquid with
   an oil, to form a mixture,
   wherein the mixture is formed in the absence of a surfactant, and in the absence of an emulsion stabilizing polymer and in the absence of a stabilizing agent; and
   before, during or after said combining removing dissolved gases from the mixture, the oil, or the aqueous liquid;
   thus forming an oil emulsion, which does not comprise either a surfactant, an emulsion stabilizing polymer or a stabilizing agent;
   wherein the removing dissolved gases comprises removing at least 99 per cent of the dissolved gas present in the mixture, the oil or the aqueous liquid; and
   wherein said oil emulsion is formed without mechanical action.

2. The process of claim 1 wherein said oil emulsion is stable for a period of from one hour to several weeks.

3. The process of claim 1 wherein removing dissolved gases comprises creating a vacuum.

4. The process of claim 1 wherein said oil is a hydrocarbon water-insoluble oil, a fluorocarbon water-insoluble oil, or combinations thereof.

5. The process of claim 1 wherein said emulsion comprises a material selected from the group consisting of a pharmaceutical treating agent, a paint, a dye, a combustion fuel, a fuel additive, a food additive, a food product, a perfume, a cosmetic product, a hygiene product, a dermatological product, an insect repellent, a mineral, and a combination thereof.

6. the process of claim 1 wherein said removing of dissolved gases comprises removing at least 99.99 per cent of the dissolved gas present in the mixture.

7. The process of claim 1 wherein said removing of dissolved gases comprises removing at least 99.999 per cent of the dissolved gas present in the mixture.

8. The process of claim 1 wherein said removing of dissolved gases comprises removing from 99 to 99.99 per cent of the dissolved gas present in the mixture.

9. A process for the production of an oil emulsion, comprising:
  combining an aqueous liquid with
  an oil, to form a mixture,
  wherein the mixture is formed in the absence of a surfactant, and in the absence of an emulsion stabilizing polymer and in the absence of a stabilizing agent; and
  before, during or after said combining removing dissolved gases from the mixture, the oil, or the aqueous liquid;
  thus forming an oil emulsion, which does not comprise either a surfactant, an emulsion stabilizing polymer or a stabilizing agent;
  wherein the removing dissolved gases comprises removing at least 99 per cent of the dissolved gas present in the mixture, the oil or the aqueous liquid; and
  wherein removing dissolved gases comprises:
  freezing the oil and the aqueous liquid; and
  creating a vacuum.

10. The process as in claim 9, wherein creating a vacuum comprises lowering the pressure to a pressure of less than about twenty Torr.

11. The process as in claim 9, wherein creating a vacuum comprises lowering the pressure to a pressure of less than about twenty milliTorr.

12. The process of claim 9 wherein said oil emulsion is formed with mechanical action.

13. The process of claim 9 wherein said oil emulsion is stable for a period of from one hour to several weeks.

14. The process as in any of claims 9 wherein creating a vacuum comprises lowering the pressure to a pressure of less than about twenty Torr.

15. The process as in any of claims 9 wherein creating a vacuum comprises lowering the pressure to a pressure of less than about twenty milliTorr.

16. The process of claim 9 wherein said oil is a hydrocarbon water-insoluble oil, a fluorocarbon water-insoluble oil, or combinations thereof.

17. The process of 9 wherein said emulsion comprises a material selected from the group consisting of a pharmaceutical treating agent, a paint, a dye, a combustion fuel, a fuel additive, a food additive, a food product, a perfume, a cosmetic product, a hygiene product, a dermatological product, an insect repellent, a mineral, and a combination thereof.

18. The process of claim 9 wherein said removing of dissolved gases comprises removing at least 99.99 per cent of the dissolved gas present in the mixture.

19. The process of claim 9 wherein said removing of dissolved gases comprises removing at least 99.999 per cent of the dissolved gas present in the mixture.

20. The process of claim 9 wherein said removing of dissolved gases comprises removing from 99 to 99.99 per cent of the dissolved gas present in the mixture.

* * * * *